US006237747B1

(12) United States Patent
Gantner et al.

(10) Patent No.: US 6,237,747 B1
(45) Date of Patent: May 29, 2001

(54) DELIVERY DEVICE FOR A SETTING TOOL WITH A NAIL MAGAZINE

(75) Inventors: Gebhard Gantner, Nenzing (AT); Markus Sprenger, Eschen (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/352,596

(22) Filed: Jul. 13, 1999

(30) Foreign Application Priority Data

Jul. 13, 1998 (DE) .............................................. 198 31 060

(51) Int. Cl.[7] .............................. B65G 25/04; B25C 5/02; B25C 5/06; B27F 7/00

(52) U.S. Cl. ........................... 198/747; 221/232; 221/268; 227/127; 227/128

(58) Field of Search ............................. 198/747; 227/108, 227/116, 119, 120, 127, 128; 221/232, 231, 268

(56) References Cited

U.S. PATENT DOCUMENTS 4,821,938 * 4/1989 Haytayan ......................... 227/120 X
4,930,673 * 6/1990 Pfister .............................. 227/120 X
5,220,123 * 6/1993 Oehry ................................ 227/10 X
5,597,972 * 1/1997 Wachter ............................. 227/10 X
5,897,046 * 11/1999 Oehri et al. ...................... 227/119 X
5,975,350 * 11/1999 Han .................................. 227/120 X
5,975,399 * 11/1999 Oehri et al. ...................... 227/120 X

* cited by examiner

*Primary Examiner*—Christopher P. Ellis
*Assistant Examiner*—Gene O. Crawford
(74) *Attorney, Agent, or Firm*—Brown & Wood, LLP

(57) ABSTRACT

A delivery device for a setting tool has a guide tube (16), a guide rail (1) projecting from the guide tube (16) substantially transverse thereto and having a guide channel (5) for receiving fastening elements (6), a slide (2) for transporting the fastening elements in a direction toward the guide tube (16), and a locking member (3) pivotable into an interior of the guide channel (5) for limiting the displacement of the fastening elements (6) located in the guide channel (5) in the direction opposite to the setting direction. The locking member (3) has a guide region (9) displaceable through a through-opening (10) formed in a side of the guide rail (1) extending parallel to the setting direction, and into the interior of the guide channel (5) into a locking position in which the guide region (9) formlockingly cooperates with the spaced from each other, stop edges of several fastening elements provided on stems of the elements.

7 Claims, 2 Drawing Sheets

DELIVERY DEVICE FOR A SETTING TOOL WITH A NAIL MAGAZINE

BACKGROUND OF THE INVENTION

1. Field of the Invention

A delivery device for a setting tool including a guide tube, a guide rail projecting from the guide tube substantially transverse thereto and having a guide channel having an upper side open in a direction opposite to a setting direction for receiving fastening elements, a slide having an entraining shoulder cooperating with the fastening elements for transporting same in a direction toward the guide tube, a spring for biasing the slide in the direction toward the guide tube, and a locking member pivotable into an interior of the guide channel for limiting displacement of the fastening elements located in the guide channel in the direction opposite to the setting direction.

2. Description of the Prior Art

The prior art discloses a setting tool for driving of nail-shaped fastening elements in, e.g., constructional component formed of wood. The setting tool includes a delivery device for receiving and guiding a plurality of fastening elements. The delivery device has a guide rail which projects from the guide tube of the setting tool substantially transverse to the guide tube. The delivery device further includes a slide displaceable along the guide rail and cooperating with a spring, with the slide preloading the spring when it is displaced to the free end of the guide rail. The slide has an entraining shoulder which projects into the interior of a guide channel of the guide rail and faces toward the guide tube. An elastic locking member is mounted on a side of the guide rail extending parallel to the setting direction. The locking member has a tangent-bent cover region which limit displacement of the fastening elements located in the guide channel in a direction opposite to the setting direction. The cover region is pivotable out of the projection of guide channel facing in a direction opposite to the setting direction in a loading position of the slide.

The fastening elements, which are located in the delivery device, have their stem regions projecting into the guide channel and their widened head-shaped end regions located in the end region of the guide rail facing in a direction opposite to the setting direction. Because the locking member can limit the displacement of the fastening elements in the direction opposite to the setting direction, the cover region of the locking member cooperates with the head-shaped end regions of the fastening elements. Because of this, the cover region is arranged in a spaced relationship with respect to the guide rail in the direction opposite to the setting direction. This results in a large overall height of the device in a direction parallel to the setting direction, which leads to difficult handling of the delivery device and, thereby, of the entire setting tool.

Accordingly, an object of the present invention is a delivery device for a setting tool which can be economically produced and which has a small height in a direction parallel to the setting direction.

SUMMARY OF THE INVENTION

This and other objects of the present invention, which will become apparent hereinafter, are achieved by providing fastening elements having two adjacent to each other stop edges which are spaced from each other in a direction parallel to the setting direction and which are provided in the stem region of a fastening element, and by providing a locking member having a guide region displaceable through a through-opening formed in a side of the guide rail extending parallel to the setting direction, and into the interior of the guide channel into a locking position in which the guide region formlockingly cooperates with the stop edges of at least one fastening element.

The formation of the locking member according to the present invention and the arrangement of the locking member on the delivery device according to the invention permit to achieve an overall height of the delivery device which only slightly exceeds the entire length of the fastening element. In addition, the inventive delivery device can be rapidly and simply loaded with the fastening elements.

In order to be able to achieve a formlocking connection between the guide region of the locking member and the fastening element, the guide region of the locking member cooperates, in the locking position of the locking member, with the two spaced stop edges of the fastening element.

In order to insure delivery of fastening elements having different diameters with the inventive delivery device, the fastening elements are surrounded, at least in their stem region, with respective guide members. The guide members can be formed, e.g., as a part of a strip-shaped nail magazine in which the separate guide members are connected with each other by connection webs. The limitation of the displacement of the fastening elements, which are surrounded by the guide members, in a direction opposite to the setting direction, is possible, e.g., by forming both stop edges of the fastening element on the guide member. E.g., the two stop edges can be formed as a part of side indentations or grooves formed in the guide members.

A reliable guidance of the fastening elements in the guide channel is preferably achieved by forming the guide region of the locking member as a strip that extends parallel to the longitudinal extent of the guide rail and has surfaces cooperating with the stop edges of the guide members. Because the strip can cooperate, in the locking position of the locking member, with several guide members, the guide region extends over several fastening elements located in the guide channel.

To provide for an automatic pivotal movement of the guide region of the locking member out of the interior of the guide channel or out of the grooves of the guide members when the slide is displaced into its loading position at the free end of the guide rail, advantageously, the locking member is formed as an elastic member.

In order to keep the depth of the guide region of the locking member in the interior of the guide channel or in the grooves of the guide members constant, advantageously, the locking member is provided, in its free end region, with a spacer which is supported, in the locking position of the locking member, against that side of the guide rail in which the through-opening is provided.

The fixing of the slide in its loading position is advantageously achieved by providing, at the free end of the locking member, a stop shoulder remote from the guide tube and formlockingly cooperating with a surface of the slide facing toward the guide tube when the slide is in its loading position at the free end of the guide rail and the locking member is in its locking position.

To provide for economical manufacture of the delivery device, preferably, the stop shoulder of the locking member is formed by the tangent-bent free end of the locking member.

In order to be able to achieve a good alignment of the stop edges of the fastening element, which are located in the guide channel or are formed on the guide member, with the guide region of the locking member, advantageously, the guide channel has at least one stop which extends parallel to the longitudinal extent of the guide rail and has a bearing surface facing in the direction opposite to the setting direction.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
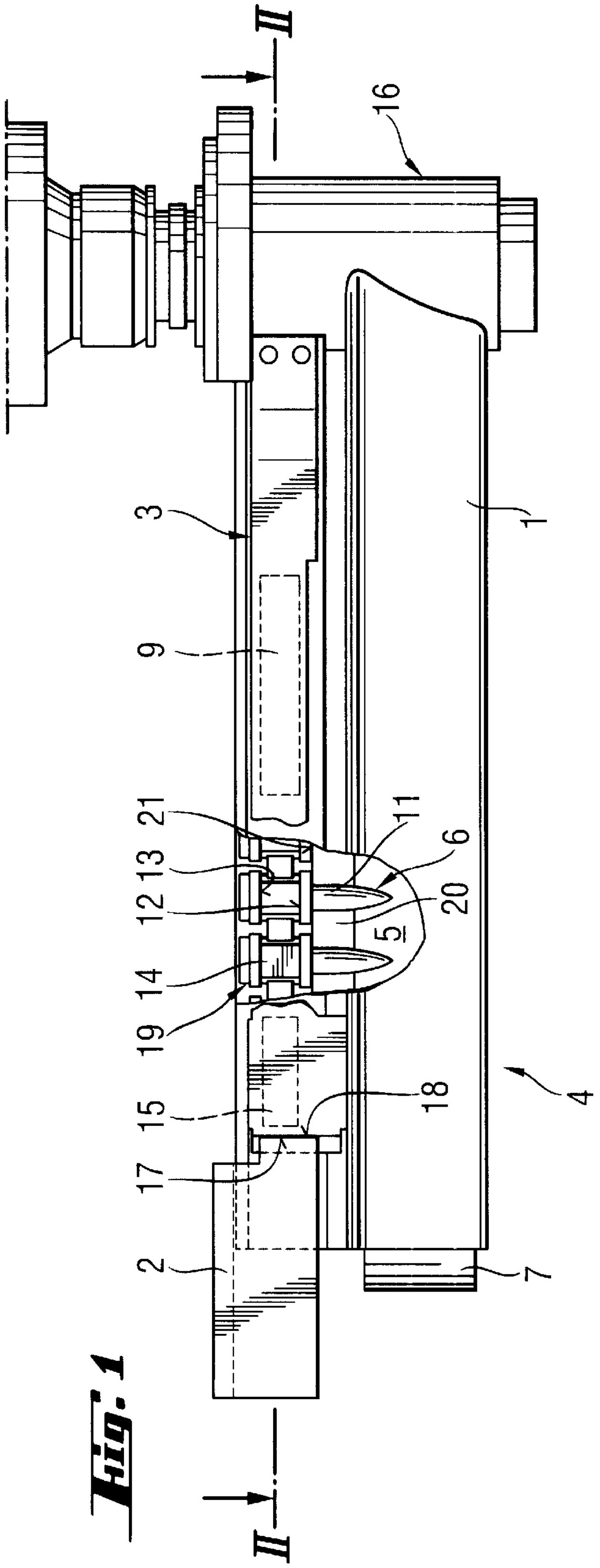
FIG. 1 shows a side view of a delivery device with a guide tube of a setting tool according to the present invention.

A delivery device 4 of a setting tool according to the present invention, which is shown in FIGS. 1–4, has a guide tube 16 which extends parallel to a setting direction and from which a guide rail 1 with a guide channel 5 projects transverse to the guide tube 16. The guide channel 5 serves for receiving and guiding a nail magazine 19 loaded with nail-shaped fastening elements 6.

Figure 3:
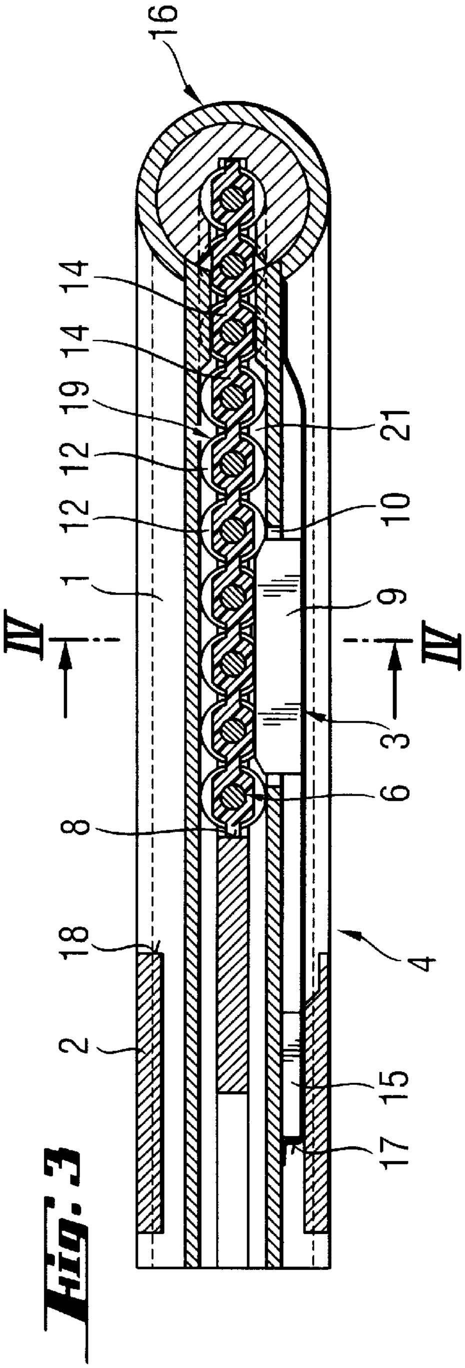
FIG. 3 shows a cross-sectional view along II—II in FIG. 1, but with the guide region projecting into the guide channel.

As particularly shown in FIGS. 1 and 3, the guide rail 1 has a substantially U-shaped cross-section. The inner width of the cross-section in a first region facing in the setting direction is larger than the inner width of the cross-section in the opposite second region which forms the guide channel 5. Between the two regions, adjacent stops 20, which are formed by the guide rail 1, extend parallel to the guide rail 1. The stops 20 are provided each with a bearing surface 21 facing in a direction opposite to the setting direction. The distance between the two stops 20 is greater than a diameter of a stem region 11 of a fastening element 6. The second region is often formed at the end of the guide rail 1 facing in the direction opposite to the setting direction, and its width in a direction transverse to the longitudinal extent of the guide rail 1 and transverse to the longitudinal extent of the fastening element 6 substantially corresponds to the diameter of a guide member 14 through which the fastening element 6 extends. This formation of the second region insures displacement of the fastening elements, which are provided with one or several guide members 14, in the setting direction in the guide channel 5 or in the second region of the guide rail 1. When the guide members 14 abut the bearing surface 21 then, e.g., the stem region 11 of the fastening elements 6 can project between the two stops 20 in the first region of the guide rail 1. A plurality of fastening elements 6 are arranged in the guide channel 5 in a form of a nail magazine in which a plurality of sleeve-shaped guide members 14 are connected with each other by connecting webs, forming a one-piece element. The guide members 14 have side indentations or grooves with adjacent to each other stop edges 12, 13.

Figure 2:
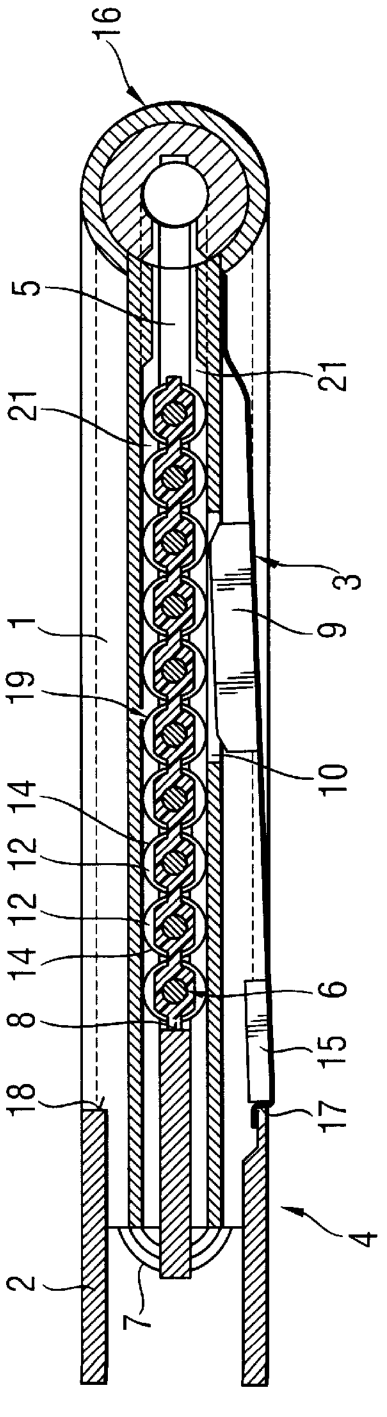
FIG. 2 shows a cross-sectional view along II—II in FIG. 1, without the guide region projecting into the guide channel.
Figure 4:
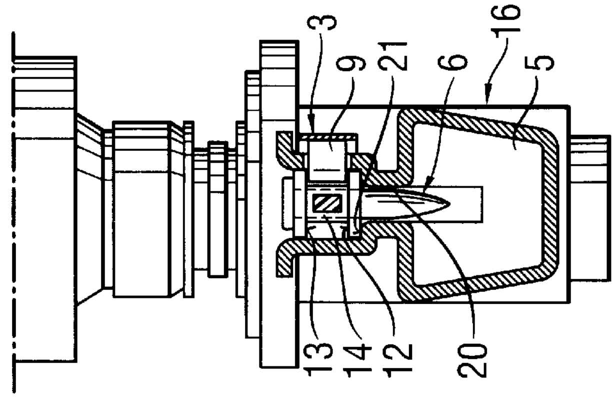
FIG. 4 shows a cross-sectional view of the delivery device along line IV—IV in FIG. 3

As shown in FIGS. 1–3, an elastic, thin-wall, locking element or member 3 is pivotally arranged on a side of the guide rail extending parallel to the setting direction. In the region of the guide channel 5, the guide rail 1 has a through-opening 10 which extends over a portion of the length of the guide rail 1. A guide region 9 of the locking member 3 can project through the opening 10 into the guide channel 5 of the guide rail 1 or into the grooves of the guide members 14. The guide region 9 is formed as a strip, and it extends at least partially over the length of the guide rail 1. The height of the guide region 9 in a direction parallel to the setting direction corresponds substantially to the distance between the spaced stop edges 12, 13 of the guide member 14, so that the guide region 9 can be formlockingly engaged between the stop edges 12, 13, as shown in FIGS. 3 and 4. In this way, the displacement of the fastening elements 6 located in the guide channel 5 is limited in the direction opposite to the setting direction.

A slide 2, which serves for transporting of the fastening elements 6 in a direction of the guide tube 16 and which is provided with an entraining shoulder 8 cooperating with the fastening elements 6, is displaceable along the guide rail 1. A spring 7 which, e.g., is connected with the slide 2 and is arranged on the guide rail 1 in the region of the guide tube 16, generates force necessary for the displacement of the fastening elements 6. The spring 7, which is not shown completely, is formed as a scroll spring. Upon displacement of the slide 2 toward the free end of the guide rail 1 in a loading position, the spring 7 becomes preloaded. In this loading position, the elastic locking member 3, together with its guide region 9, pivots out of the interior of the guide channel 5 or out of the indentation in the guide member 14, providing for insertion of further fastening elements 6 into the guide channel 5.

The locking member 3 has, at its free end, a spacer 15 and a stop shoulder 17. In the locking position of the guide region 9, the spacer 15 is supported against that side of the guide rail in which the through-opening 10 is arranged, and the stop shoulder 17 formlockingly cooperates with a surface 18 of the slide 2 adjacent to the guide tube 16. Thereby, the slide 2 is retained in the loading position until the guide region 9 of the locking member 3 again pivots into the interior of the guide channel 5.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A delivery device (4) for a setting tool, comprising a guide tube (16); a guide rail (1) projecting from the guide tube (16) substantially transverse thereto and having a guide channel (5) having an upper side open in a direction opposite to a setting direction for receiving fastening elements (6) with two adjacent to each other stop edges (12, 13) spaced from each other in a direction parallel to the setting direction and provided in a stem region of a fastening element; a slide (2) having an entraining shoulder (8) cooperating with the fastening elements (6) for transporting same in a direction toward the guide tube (16); a spring (7) for biasing the slide (2) in the direction toward the guide tube (16); and a locking member (3) pivotable into an interior of the guide channel (5) for limiting the displacement of the fastening elements (6) located in the guide channel (5) in the direction opposite to the setting direction, the locking member (3) having a guide region (9) displaceable through a through-opening (10) formed in a side of the guide rail (1) extending parallel to the setting direction, and into the interior of the guide channel (5) into a locking position in which the guide region (9) form-lockingly cooperates with the stop edges (12,13) of several fastening elements (6);

wherein the guide region (9) of the locking member (3) is formed as a strip extending parallel to a longitudinal extent of the guide rail (1) and having surfaces cooperating with the stop edges (12, 13) of the fastening elements.

2. A delivery device according to claim 1, wherein the two stop edges (12, 13) of the fastening element (6) are formed by a sleeve-shaped guide member (14) surrounding the stem region (11) of the fastening element (6).

3. A delivery device according to claim 1, wherein the locking member (3) is formed as an elastic member.

4. A delivery device according to claim 1, wherein the locking member (3) has, in a free end region thereof, a spacer (15) supported, in the locking position of the guide region (9), on the side of the guide rail (1) in which the through-opening (10) is formed.

5. A delivery device according to claim 1, wherein the guide channel (5) has at least one stop (20) extending parallel to a longitudinal extent of the guide rail (1) and having a bearing surface (21) facing in a direction opposite to the setting direction.

6. A delivery device (4) for a setting tool, comprising a guide tube (16); a guide rail (1) projecting from the guide tube (16) substantially transverse thereto and having a guide channel (5) having an upper side open in a direction opposite to a setting direction for receiving fastening elements (6) with two adjacent to each other stop edges (12, 13) spaced from each other in a direction parallel to the setting direction and provided in a stem region of a fastening element; a slide (2) having an entraining shoulder (8) cooperating with the fastening elements (6) for transporting same in a direction toward the guide tube (16); a spring (7) for biasing the slide (2) in the direction toward the guide tube (16); and a locking member (3) pivotable into an interior of the guide channel (5) for limiting the displacement of the fastening elements (6) located in the guide channel (5) in the direction opposite to the setting direction, the locking member (3) having a guide region (9) displaceable through a through-opening (10) formed in a side of the guide rail (1) extending parallel to the setting direction, and into the interior of the guide channel (5) into a locking position in which the guide region (9) form-lockingly cooperates with the stop edges (12, 13) of an at least one fastening element (6);

wherein a free end of the locking member (3) has a stop shoulder (17) remote from the guide tube (16) and formlockingly cooperating with a surface (18) of the slide (2) facing toward the guide tube (16) when the slide (2) is located at a free end region of the guide rail (1) in a loading position, and the guide region (9) of the locking member (3) is in the locking position thereof.

7. A delivery device according to claim 6, wherein the stop shoulder (17) is formed by the tangent-bent free end of the locking member (3).

* * * * *